US011975590B2

(12) United States Patent
Fujikawa et al.

(10) Patent No.: US 11,975,590 B2
(45) Date of Patent: May 7, 2024

(54) CAB FOR CONSTRUCTION MACHINE

(71) Applicant: KOBELCO CONSTRUCTION MACHINERY CO., LTD., Hiroshima (JP)

(72) Inventors: Koji Fujikawa, Hiroshima (JP); Shunsuke Tada, Hiroshima (JP); Yohei Tashiro, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 659 days.

(21) Appl. No.: 17/257,934

(22) PCT Filed: Jun. 12, 2019

(86) PCT No.: PCT/JP2019/023309
§ 371 (c)(1),
(2) Date: Jan. 5, 2021

(87) PCT Pub. No.: WO2020/021894
PCT Pub. Date: Jan. 30, 2020

(65) Prior Publication Data
US 2021/0276392 A1 Sep. 9, 2021

(30) Foreign Application Priority Data
Jul. 27, 2018 (JP) ................................ 2018-141074

(51) Int. Cl.
 B60H 1/00 (2006.01)
 B60H 1/34 (2006.01)
 E02F 9/16 (2006.01)
(52) U.S. Cl.
 CPC ..... B60H 1/00285 (2013.01); B60H 1/00378 (2013.01); B60H 1/00564 (2013.01);
 (Continued)

(58) Field of Classification Search
 CPC ............ B60H 1/00285; B60H 1/00378; B60H 1/00564; B60H 1/34
 (Continued)

(56) References Cited

U.S. PATENT DOCUMENTS 6,290,286 B1  9/2001 Murakami et al.
2004/0194488 A1  10/2004 Kamimae et al.
(Continued)

FOREIGN PATENT DOCUMENTS

CN        1536177 A   10/2004
CN      107428221 A   12/2017
(Continued)

OTHER PUBLICATIONS

International Search Report dated Jul. 23, 2019 in PCT/JP2019/023309 filed on Jun. 12, 2019, 2 pages.
(Continued)

*Primary Examiner* — Allen R. B. Schult
(74) *Attorney, Agent, or Firm* — Oblon, McClelland, Maier & Neustadt, L.L.P.

(57) ABSTRACT

A cab for a construction machine includes; an operator seat including a seat base and a backrest; a control box disposed along a lateral side of the operator seat; an air conditioner main body for cooling air; and a duct disposed behind the operator sea for guiding a cooling air generated in the air conditioner main body. The duct has a blowing port provided at such a position as to allow the cooling air to flow frontward along at least one of a lateral side of the seat base and a lateral side of a lower portion of the backrest and along an inner surface of the control box.

7 Claims, 13 Drawing Sheets

(52) U.S. Cl.
CPC .................. B60H 1/34 (2013.01); E02F 9/16 (2013.01); *B60Y 2200/41* (2013.01)

(58) Field of Classification Search
USPC .......................................................... 454/120
See application file for complete search history.

(56) References Cited

U.S. PATENT DOCUMENTS

2012/0096886 A1* 4/2012 Palmer .................. B60N 2/5692
165/104.34
2018/0117987 A1   5/2018 Yamaoka et al.

FOREIGN PATENT DOCUMENTS

| JP | 10-129237 A | 5/1998 |
|---|---|---|
| JP | 2000-192512 A | 7/2000 |
| JP | 2001-30738 A | 2/2001 |
| JP | 2004-74884 A | 3/2004 |
| JP | 2004-338457 A | 12/2004 |
| JP | 2006-218902 A | 8/2006 |
| JP | 2007-245894 A | 9/2007 |
| JP | 2010-195196 A | 9/2010 |

OTHER PUBLICATIONS

Combined Chinese Office Action and Search Report dated May 25, 2023 in Chinese Patent Application No. 201980047577.9 (with English summary), 8 pages.

Extended European Search Report dated Jul. 29, 2021 in European Patent Application No. 198420479.6, 7 pages.

Japanese Office Action dated Feb. 1, 2021 in Japanese Patent Application No. 2018-141074 (with English translation), 6 pages.

* cited by examiner

CAB FOR CONSTRUCTION MACHINE

TECHNICAL FIELD

The present invention relates to a cab including an air conditioner for a construction machine.

BACKGROUND ART

Cabs each including an air conditioner for construction machines have been conventionally known. For instance, an air conditioner disclosed in Patent Literature 1 includes a left blowing port located diagonally behind an operator seat to the left thereof, a right blowing port located diagonally behind the operator seat to the right thereof, and a to-ceiling blowing port located behind the operator seat. Patent Literature 1 further discloses that a back window and a ceiling window are covered with an air curtain formed by a cooling air blown out from the ceiling blowing port, and that a left window and a right window are covered with air curtains formed by the cooling air blown out from the left blowing port and the right blowing port. In the air conditioner described in paragraph [0021] and shown in FIG. 2 of Patent Literature 1, each of the left blowing port and the right blowing port is at such a vertical level as to allow the air to blow toward a left window region and a right window region each facing a headrest.

Meanwhile, an operator on a seat base of the operator seat may feel uncomfortable when the operator's thigh being in contact with a top surface of the seat base get sweaty and damp during an operation. In this respect, the air conditioner disclosed in Patent Literature 1 gives no consideration to such sweating and damping on the operator's thigh.

CITATION LIST

Patent Literature

Patent Literature 1: Japanese Unexamined Patent Publication No. 2010-195196

SUMMARY OF INVENTION

The present invention has been accomplished to solve the aforementioned problem, and an object of the present invention is to provide a cab including an air conditioner which can suppress an occurrence of sweating and damping on operator's thigh being in contact with a top surface of a seat base of an operator seat.

Provided by the present invention is a cab for a construction machine, including: an operator seat including a seat base and a backrest extending upward from the seat base; a control box disposed along a lateral side of the operator seat; an air conditioner main body for cooling an air; and a duct disposed behind the operator seat for guiding a cooling air generated in the air conditioner main body. The control box has an inner surface extending in a front-rear direction along the seat base. The duct has a blowing port for blowing out the cooling air. The blowing port is at such a position as to allow the cooling air blown out from the blowing port to flow frontward along at least one of a lateral side of the seat base and a lateral side of a lower portion of the backrest and along the inner surface of the control box.

DESCRIPTION OF EMBODIMENTS

Hereinafter, a preferable embodiment of the present invention will be described with reference to the accompanying drawings.

[Overall Structure of Construction Machine]

Figure 1:
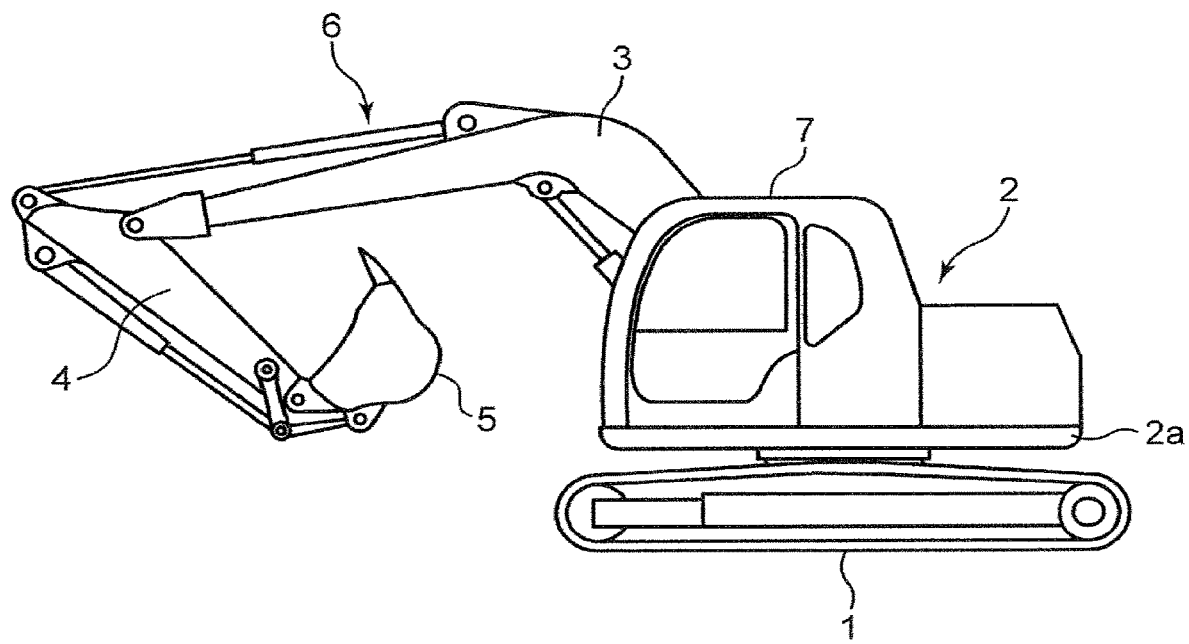
FIG. 1 is an overall side view of a hydraulic excavator which is a construction machine mounted with a cab according to an embodiment of the present invention.

FIG. 1 shows a hydraulic excavator which is an exemplary construction machine mounted with a cab according to the present invention. The hydraulic excavator includes a lower traveling body 1 of the crawler type, an upper slewing body 2 slewably mounted thereon, and a working device 6 mounted on the upper slewing body 2. The upper slewing body 2 includes a slewing frame 2a coupled to the lower traveling body 1, and a cab 7 mounted on the slewing frame 2a. The working device 6 includes a boom 3 connected with a front end (a front-right end in the example shown in FIG. 1) of the slewing frame 2a such that the boom 3 can be raised and lowered, an arm 4 rotatably connected with a leading end of the boom 3, and a bucket 5 rotatably connected with a leading end of the arm 4.

The cab 7 is mounted on a front part (a front-left part in the example shown in FIG. 1) of the slewing frame 2a to be adjacent to the boom 3 in a width direction of the slewing frame 2a, and constitutes an operator compartment for maneuvering the hydraulic excavator. Specifically, performed in the cab 7 are operations of traveling the lower traveling body 1, slewing the upper slewing body 2, and causing the working device 6 to work.

[Structure of Cab]

Figure 2:
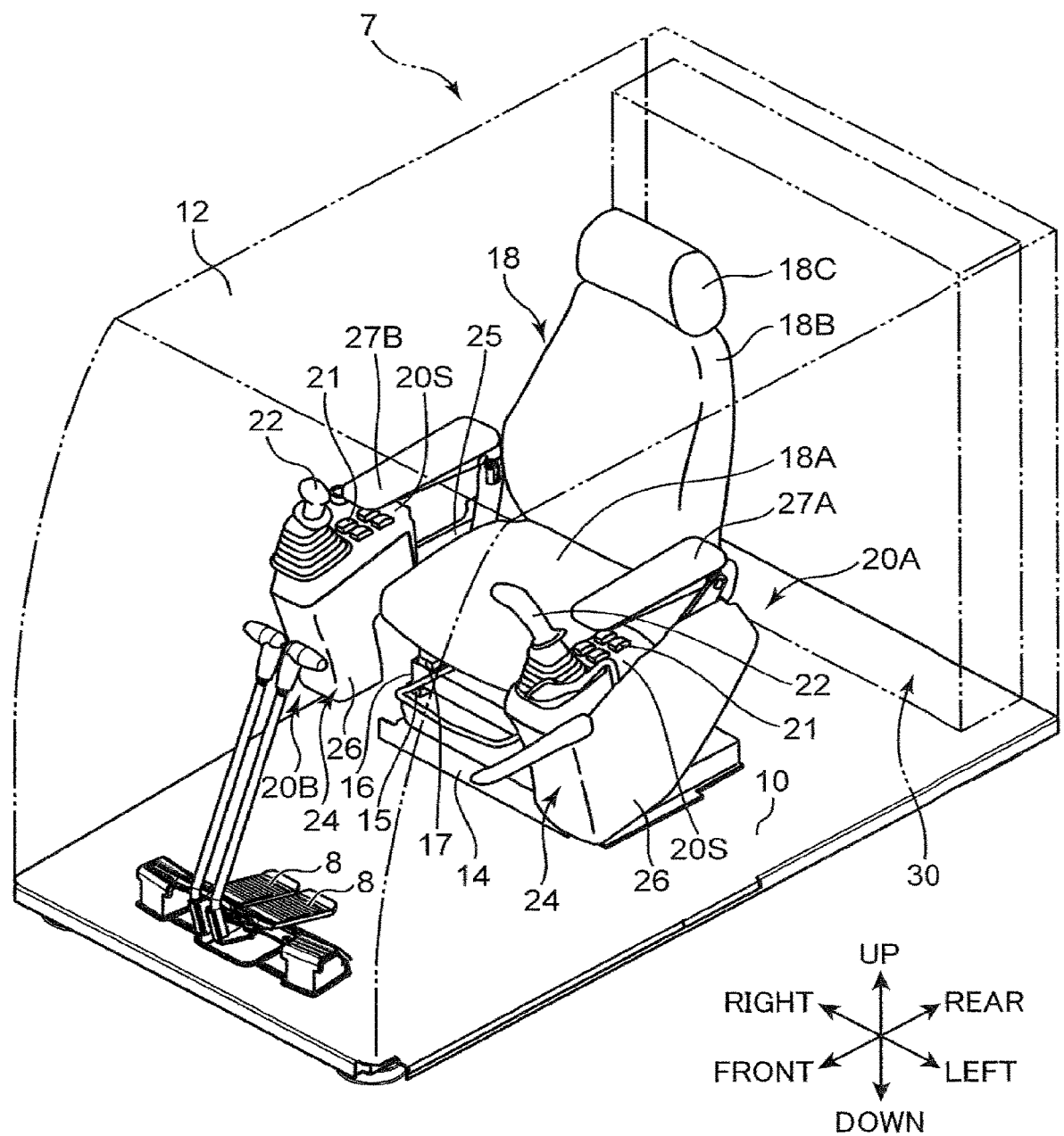
FIG. 2 is a schematic perspective view of the cab according to the embodiment.

As shown in FIG. 2, the cab 7 includes a floor plate 10, a cab outer wall 12, a seat stand 14, an intermediate plate 16, an operator seat 18, left and right traveling pedals 8, 8, left and right control boxes 20A, 20B, left and right armrests 27A, 27B, and an air conditioner 30.

The floor plate 10 is a horizontally extending plate that constitutes a floor part of the cab 7. The cab outer wall 12 defines an operator compartment space above the floor plate 10. The seat stand 14 is fixedly attached to an upper surface of the floor plate 10. The intermediate plate 16 lies over the seat stand 14 via a pair of left and right first slide rails 15 (see FIGS. 2 and 3) slidably in a front-rear direction with respect to the seat stand 14.

The operator seat 18 permits the operator to sit thereon. The operator seat 18 is arranged at the substantially center of the cab 7 in a plan view. The cab outer wall 12 is formed with a window at least at the front thereof to ensure a good visibility in front of the operator on the operator seat 18 through the window. The operator seat 18 includes a seat base 18A, a backrest 18B, and a headrest 18C. The seat base 18A receives the operator's buttocks put thereon. The backrest 18B is attached to a rear end of the seat base 18A and extends upward therefrom for supporting the operator's torso. The headrest 18C is a pillow-shaped member attached to an upper end of the backrest 18B for supporting the operator's head. The headrest 18C constitutes an upper part of the operator seat 18.

The left and right traveling pedals 8, 8 are aimed at causing the lower traveling body 1 to travel. The traveling pedals 8, 8 are provided on the floor plate 10. The operator on the operator seat 18 can cause the lower traveling body 1 to travel by pressing the left and right traveling pedals 8, 8 located in front of the operator seat 18.

Figure 3:
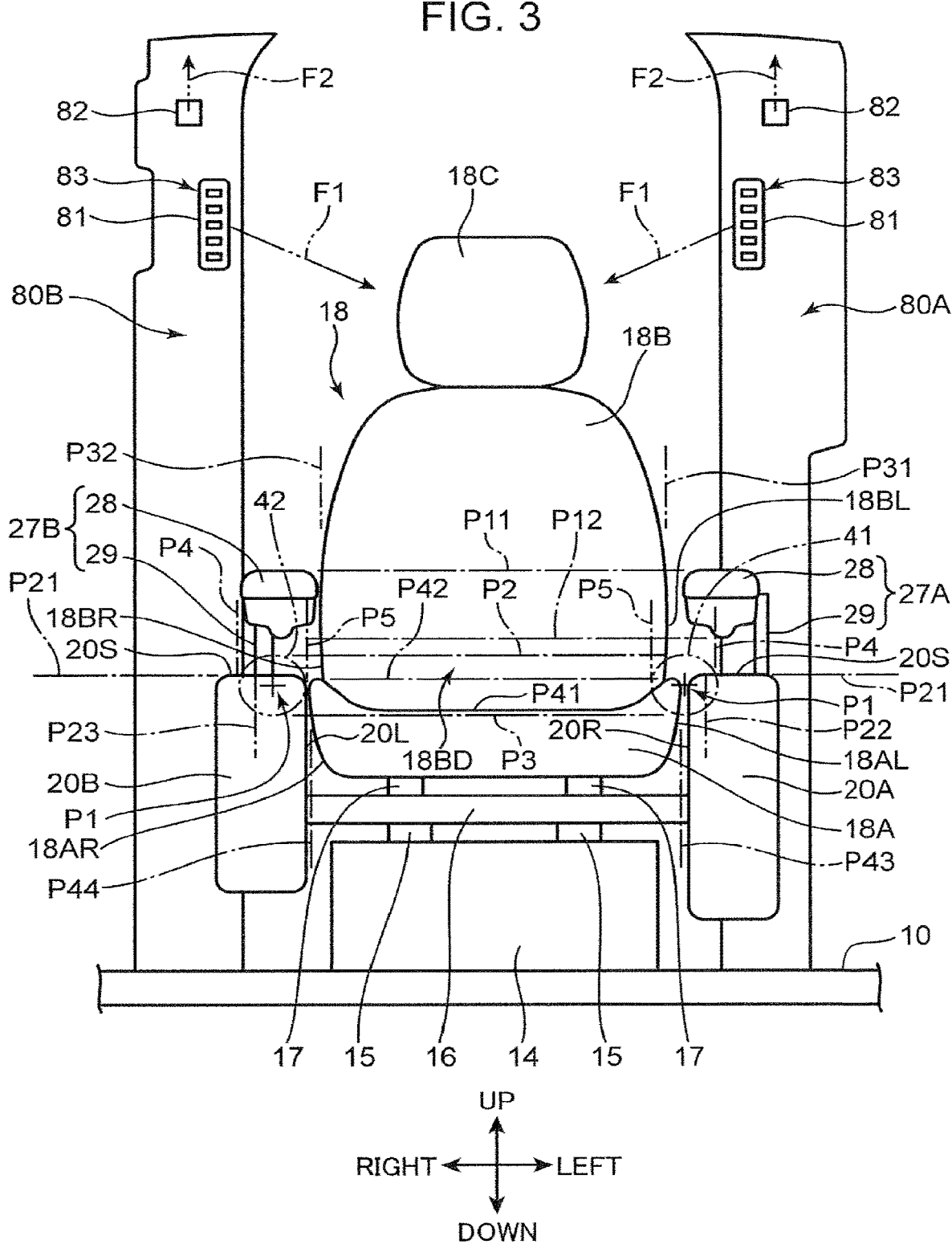
FIG. 3 is a schematic front view explaining a positional relation among an operator seat, left and right control boxes, and a plurality of blowing ports of an air conditioner in the cab according to the embodiment.

The left control box 20A is disposed along the left side of the operator seat 18 and the right control box 20B is disposed along the right side of the operator seat 18. Each of the left and right control boxes 20A, 20B has a manipulation lever 22 and a box main body 24. As shown in FIG. 3, the left control box 20A has a right surface 20R (an inner surface) extending in the front-rear direction along the seat base 18A, and the right control box 20B has a left surface 20L (an inner surface) extending in the front-rear direction along the seat base 18A.

The manipulation lever 22 shown in FIG. 2 is rotatably shifted frontward, rearward, leftward, and rightward in response to a manipulation of the operator on the operator seat 18. Such manipulation is executed for the operation of stewing the upper slewing body 2, causing the working device 6 to work, or the like.

As shown in FIG. 2, the box main body 24 extends in the front-rear direction along a lateral side of the operator seat 18. The box main body 24 includes a frame 25 made of a metal, a cover 26 made of a resin material, and a plurality of switches 21. The frame 25 holds the manipulation lever 22, and an unillustrated pilot valve openable and closable in response to the manipulation to the manipulation lever 22. The cover 26 is mounted to the frame 25 in such a way as to cover the frame 25, the pilot valve, and unillustrated hydraulic pipe, electric wires, and other components. The manipulation lever 22 is held on the frame 25 and protrudes upward from a top surface 20S of the cover 26 (a top surface 20S of each of the control boxes 20A, 20B) at a front part of the box main body 24 by penetrating through the cover 26.

The plurality of switches 21 is provided on the top surface 20S of each of the control boxes 20A, 20B. Specifically, the plurality of switches 21 is held by the frame 25 to be exposed on the top surface of the cover 26. The plurality of switches 21 is located behind the manipulation lever 22 (specifically, just behind the manipulation lever 22).

As shown in FIGS. 2 and 3, the left control box 20A is fixedly attached to a left end of the intermediate plate 16, and the right control box 20B is fixedly attached to a right end of the intermediate plate 16 so that the control boxes 20A, 20B are integrally slidable with the intermediate plate 16.

The operator seat 18 lies above the intermediate plate 16 via a pair of left and right second slide rails 17 slidably in the front-rear direction with respect to the intermediate plate 16. The sliding action of the first and second slide rails 15, 17 enables adjustment of a relative positional relation in the front-rear direction among a cab main body including the floor plate 10 and the cab outer wall 12, the operator seat 18, the left and right control boxes 20A, 20B, and the left and right armrests 27A, 27B. Specifically, the sliding of the intermediate plate 16 in the front-rear direction with respect to the seat stand 14 enables adjustment of relative positions of the operator seat 18, the left and right control boxes 20A, 20B, and the left and right armrests 27A, 27B to the cab main body. Further, the sliding of the operator seat 18 with respect to the intermediate plate 16 enables adjustment of the relative position of the operator seat 18 to the left and right control boxes 20A, 20B, and the left and right armrests 27A, 27B.

The left armrest 27A is arranged on the left of the operator seat 18, and the right armrest 27B is arranged on the right of the operator seat 18. The left armrest 27A supports the operator's left arm, and the right armrest 27B supports the operator's right arm. As shown in FIG. 3, each of the left and right armrests 27A, 27B includes an armrest main body 28, and a support member 29. The armrest main body 28 is aimed at supporting a forearm of the operator on the operator seat 18 while the operator on the operator seat 18 manipulates the manipulation lever 22, and hence is arranged just above each of the left and right control boxes 20A, 20B and has a shape extending in the front-rear direction for supporting the operator's forearm.

The support member 29 supports the armrest main body 28. In the embodiment, the support member 29 is coupled to a rear end of the armrest main body 28 for supporting the armrest main body 28 rotatably about the rear end. The support member 29 has one end (a lower end) attached to the frame 25, and another end (an upper end) attached to the armrest main body 28. In this way, the armrest main body 28 is held by the frame 25 via the support member 29. The left and right armrests 27A, 27B are therefore moved in the front-rear direction integrally with the left and right control boxes 20A, 20B in accordance with the above-described sliding of the intermediate plate 16 in the front-rear direction with respect to the seat stand 14. Additionally, the support member 29 has a height adjusting mechanism for adjusting the height of the armrest main body 28.

A valve such as the pilot valve is a member having a temperature which is likely to rise during an operation of the construction machine, and thus each of the control boxes 20A, 20B including the valve such as the pilot valve also has a temperature which is likely to rise. The operator on the operator seat 18 intervening between the left and right control boxes 20A, 20B may feel uncomfortable (or feel hot) when receiving an influence of heat from the control boxes 20A, 20B particularly onto the operator's thighs and therearound. To prevent the discomfort, the cab 7 according to the embodiment includes the air conditioner 30 to be described below. The air conditioner 30 can supply the cooling air to the thighs of the operator on the operator seat 18 and therearound in the cab 7, to the head of the operator and therearound, and to the ceiling and therearound for effective thermal insulation there.

[Structure of Air Conditioner]

Figure 4:
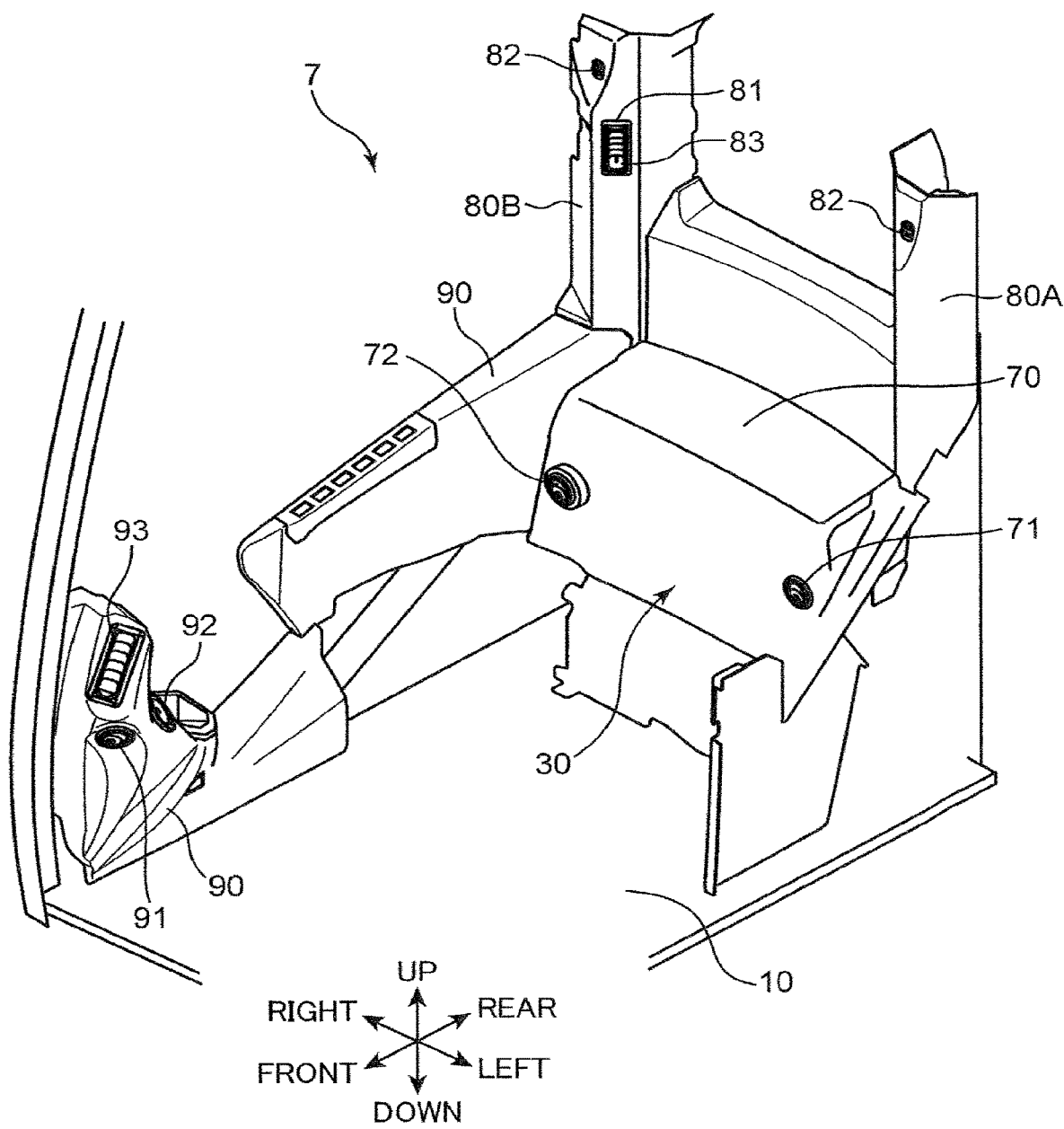
FIG. 4 is a schematic perspective view of the air conditioner in the cab according to the embodiment.
Figure 5:
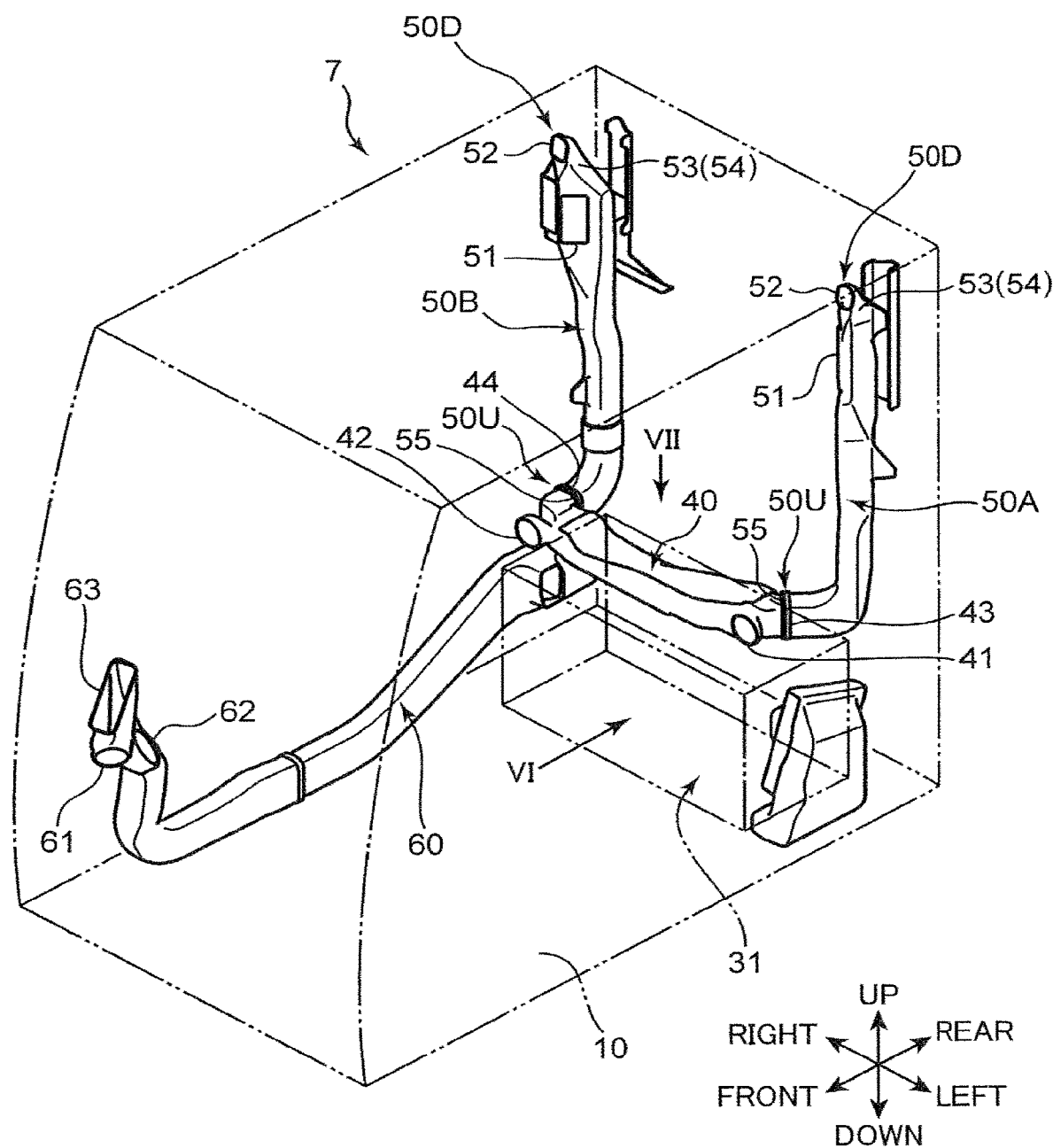
FIG. 5 is a perspective view showing a duct structure of the air conditioner in the cab according to the embodiment.

The air conditioner 30 performs air conditioning of the operator compartment space in the cab 7. FIG. 4 is a schematic perspective view of the air conditioner 30 in the cab 7 according to the embodiment. FIG. 5 is a perspective view showing a duct structure of the air conditioner 30 in the cab 7 according to the embodiment. As shown in FIGS. 4 and 5, the air conditioner 30 includes an air conditioner main body 31, a plurality of ducts 40, 50A, 50B, 60, and a plurality of covers 70, 80A, 80B, 90 for covering the corresponding ducts.

The air conditioner main body 31 can have at least a cooling function of cooling the air in the operator compartment space, and should not be particularly limited to a specific configuration. The air conditioner main body 31 may additionally have a warming function, a dehumidifying function, and the like. The air conditioner main body 31 in the embodiment is arranged behind the operator seat 18 on the floor plate 10.

Figure 6:
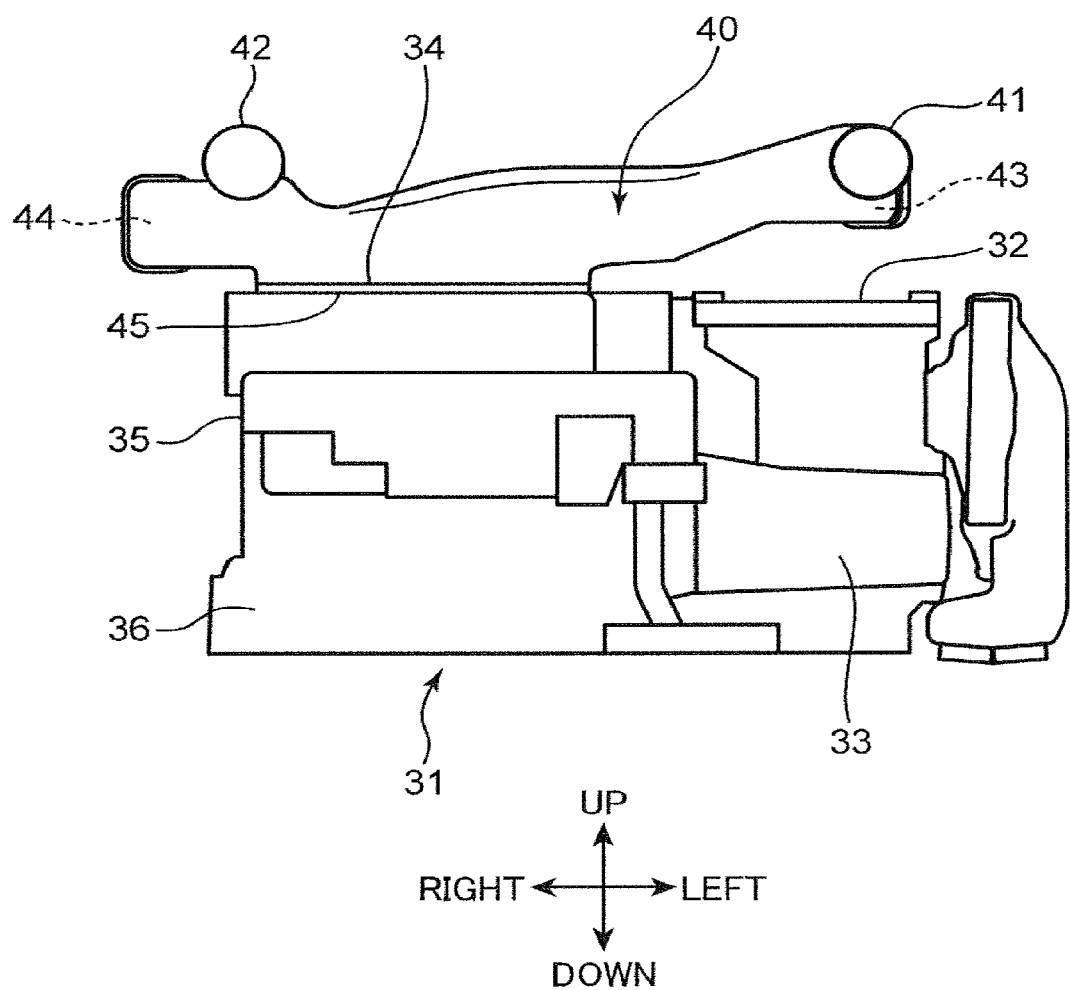
FIG. 6 is a front view of an air conditioner main body seen in the direction of the arrow VI in FIG. 5.
Figure 7:
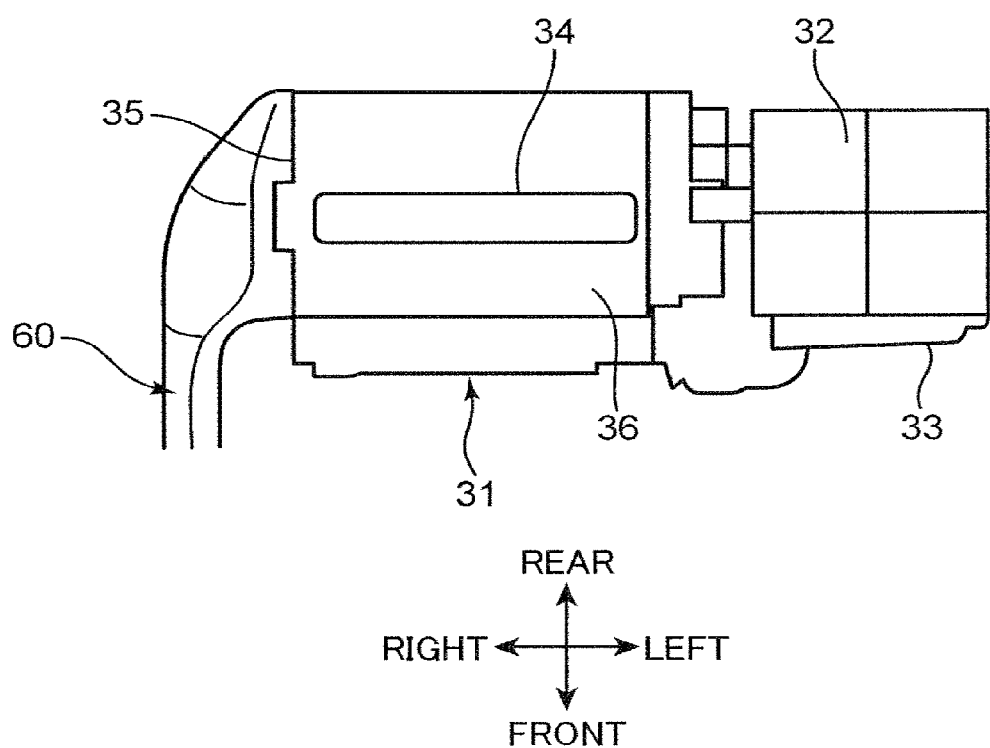
FIG. 7 is a plan view of the air conditioner main body seen in the direction of the arrow VII in FIG. 5.

As shown in FIGS. 6 and 7, the air conditioner main body 31 further includes a casing 36, a fan 33, and an unillustrated compressor. The casing 36 has an air inlet 32 and air outlets 34, 35. When the fan 33 rotates, the air in the operator compartment space is taken into the casing 36 from the air inlet 32 to be cooled therein. Thereafter, the cooling air is blown out from the air outlets 34, 35.

In the embodiment, the air conditioner main body 31 has a substantially rectangular parallel-piped shape with a larger dimension in the left-right direction than a dimension in the front-rear direction. The air inlet 32 and the fan 33 are arranged on one side (on a left side in the detailed examples shown in FIGS. 6 and 7) in the left-right direction of the air conditioner main body 31. The air outlets 34, 35 are arranged on the other side (a right side in the detailed examples shown in FIGS. 6 and 7) in the left-right direction of the air conditioner main body 31. Besides, as shown in FIG. 7, the air outlet 34 is provided on a top surface of the casing 36, and has a substantially rectangular shape with a larger dimension in the left-right direction than a dimension in the front-rear direction. The air outlet 35 is provided on a side surface (a right side surface in the detailed examples shown in FIGS. 6 and 7) of the casing 36.

As shown in FIG. 5, the plurality of ducts includes a center duct 40, a pair of rear ducts 50A, 50B (a rear-left duct 50A and a rear-right duct 50B), and a front duct 60. The center duct 40, the rear-left duct 50A, and the rear-right duct 50B are arranged behind the operator seat 18. Specifically, the center duct 40 is arranged just behind the operator seat 18, the rear-left duct 50A is arranged diagonally behind the operator seat 18 to the left thereof, and the rear-right duct 50B is arranged diagonally behind the operator seat 18 to the right thereof. The front duct 60 extends from a specific position behind the operator seat 18 to reach another specific position in front of the operator seat 18 along a side (a right side in the detailed example shown in FIG. 5) of the operator seat 18.

[Center Duct]

Figure 8:
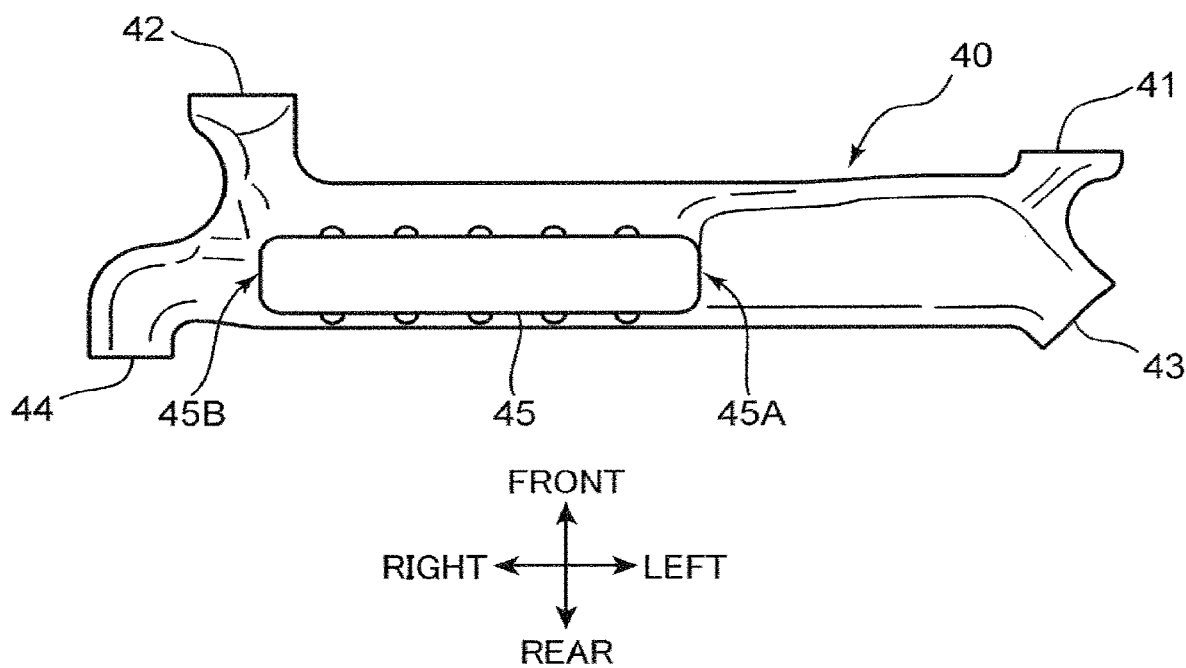
FIG. 8 is a bottom view of a center duct of the air conditioner in the cab according to the embodiment.

As shown in FIGS. 5, 6, and 8, the center duct 40 receives the cooling air blown out from the air outlet 34 provided on the top surface of the air conditioner main body 31, and guides the cooling air leftward and rightward. In the embodiment, the center duct 40 is disposed among the air outlet 34 of the air conditioner main body 31, the rear-left duct 50A, and the rear-right duct 50B, and distributes the cooling air blown out from the air outlet 34 to the rear-left duct 50A and the rear-right duct 50B.

The center duct 40 has a laterally extending shape (a long and slender shape in the left-right direction). The center duct 40 has a left blowing port 41 (a to-thigh left blowing port 41), a right blowing port 42 (a to-thigh right blowing port 42), a left connection port 43, a right connection port 44, and a connection port 45 (an air inflow port).

The connection port 45 is located between the left blowing port 41 and the right blowing port 42 in the left-right direction. The connection port 45 is located between the left connection port 43 and the right connection port 44 in the left-right direction.

The connection port 45 is connected with the air outlet 34. As shown in FIGS. 7 and 8, the connection port 45 has a shape corresponding to that of the air outlet 34 of the air conditioner main body 31. In other words, the connection port 45 has a substantially rectangular shape with a larger dimension in the left-right direction than a dimension in the front-rear direction. The cooling air blown out from the air outlet 34 flows into the center duct 40 through the connection port 45.

Figure 9:
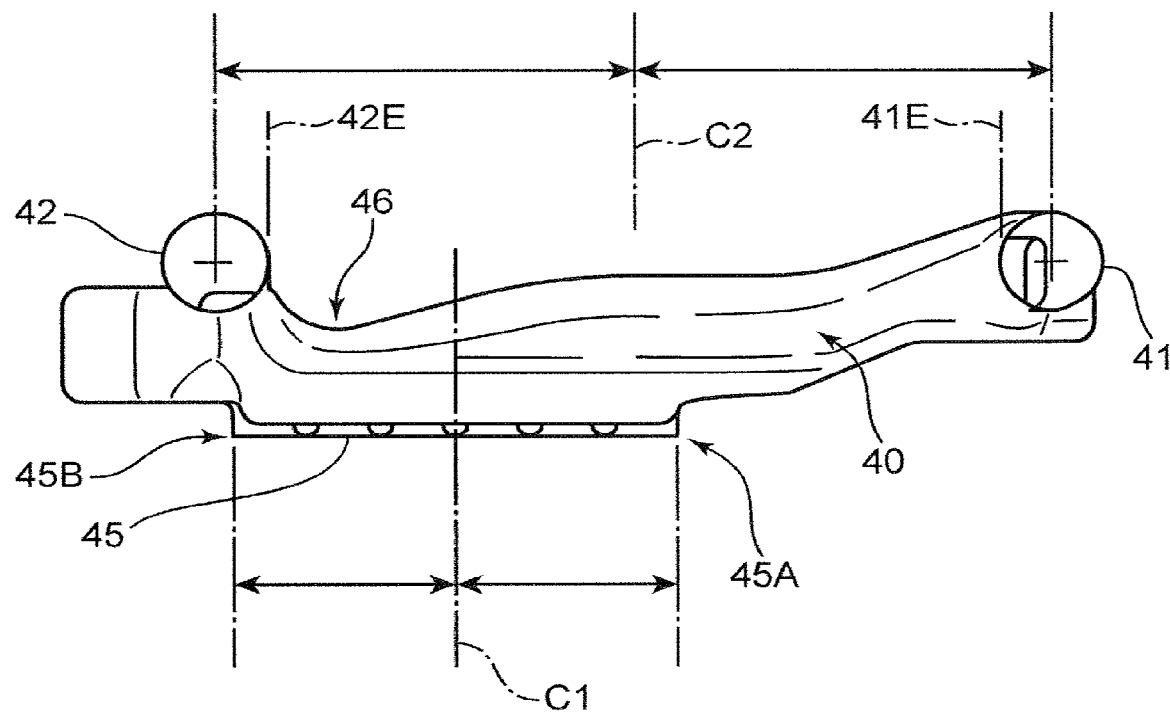
FIG. 9 is a front view of the center duct of the air conditioner in the cab according to the embodiment.
Figure 9:
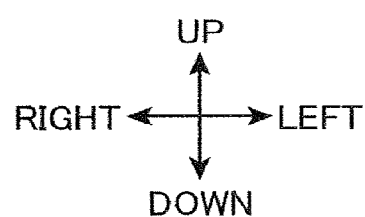

As shown in FIG. 9, in the embodiment, a central position C1 of the connection port 45, i.e., a central position C1 between a left end 45A and a right end 45B of the connection port 45, in the left-right direction deviates from a central position C2 between the center of the left blowing port 41 and the center of the right blowing port 42 in the left-right direction to one side (a right side in the detailed example shown in FIG. 9) in the left-right direction. In other words, the central position C1 of the connection port 45 is closer to the right blowing port 42 than the left blowing port 41. In the case where the connection port 45 is located on the one side in the left-right direction as described above, a flow rate of the air blown out from the right blowing port 42 is greater than a flow rate of the air blown out from the left blowing port 41. Moreover, as shown in FIG. 7, the fan 33 is arranged on the other side (on the left side in the example shown in FIG. 7) opposite to the air outlet 34 in the left-right direction of the air conditioner main body 31 in the embodiment. In this case, the amount of air taken in and sent to the air outlet 34 by the fan 33 readily increases on one side (a right side in the detailed example shown in FIG. 7) in the left-right direction of the air outlet 34.

In the embodiment, as shown in FIG. 9, the center duct 40 has a minimal flow passage portion 46 for suppressing such an unequal flow rate of the air in the left-right direction as described above. The minimal flow passage portion 46 deviates from the central position C1 of the connection port 45 to the one side (the right side in the detailed example shown in FIG. 9) in the left-right direction of the center duct 40. Specifically, the minimal flow passage portion 46 is located between the central position C1 of the connection port 45 and an inner end of one of the blowing ports (a left end 42E of the right blowing port 42 in the detailed example shown in FIG. 9) in the left-right direction of the center duct 40.

The minimal flow passage portion 46 has the smallest flow passage cross-sectional area between a right end 41E (an inner end) of the left blowing port 41 and the left end 42E (the inner end) of the right blowing port 42 of the center duct 40. For comparison among flow passage cross-sectional areas between the right end 41E and the left end 42E, each of the flow passage cross-sectional areas is defined as an area (a flow passage area) in a cross section obtainable by cutting the center duct 40 along a plane perpendicularly intersecting the left-right direction at an inner position than an inner surface of the center duct 40.

The left blowing port 41 and the right blowing port 42 are provided for supplying the cooling air to the thighs of the operator on the operator seat 18 and therearound, and to the inner surfaces of the control boxes 20A, 20B and therearound. The left blowing port 41 and the right blowing port 42 open frontward for allowing the cooling air to blow further frontward therefrom. Each of the left blowing port 41 and the right blowing port 42 is at such a lateral position and on such a vertical level as to allow the cooling air to be supplied to the thighs of the operator on the operator seat 18 and therearound. In the embodiment, the left blowing port 41 is located at a left end of the center duct 40, and the right blowing port 42 is located at a right end of the center duct 40.

As shown in FIG. 3, the left blowing port 41 is at such a position as to allow the cooling air to flow frontward along at least one of a left side of a left side surface 18AL (an outer side surface) of the seat base 18A and a left side of a left side surface 18BL (an outer side surface) of a lower portion 18BD of the backrest 18B and along the right surface 20R (the inner surface) of the left control box 20A. The right blowing port 42 is at such a position as to allow the cooling air to flow frontward along at least one of a right side of a right side surface 18AR (an outer side surface) of the seat base 18A and a right side of a right side surface 18BR (an outer side surface) of the lower portion 18BD of the backrest 18B and along the left surface 20L (the inner surface) of the right control box 20B.

As shown in FIGS. 5 and 8, the left connection port 43 and the right connection port 44 are provided for distributing, to the rear-left duct 50A and the rear-right duct 50B, the cooling air guided by the center duct 40. The left connection port 43 and the right connection port 44 open rearward or diagonally rearward. The left connection port 43 is connected with a connection port 55 at an upstream end 50U (a lower end 50U) of the rear-left duct 50A. The right connection port 44 is connected with a connection port 55 at an upstream end 50U (a lower end 50U) of the rear-right duct 50B. The left connection port 43 is located at the left end of the center duct 40, and the right connection port 44 is located at the right end of the center duct 40. The center duct 40 having the above-described minimal flow passage portion 46 can suppress the unequal flow rate of the cooling air guided by the center duct 40 and distributed to the rear-left duct 50A and the rear-right duct 50B in the left-right direction.

[Locations of Left Blowing Port and Right Blowing Port]

A preferable aspect concerning a vertical level and a position in the left-right direction (a lateral position) of each of the left blowing port 41 and the right blowing port 42 will be described by using a detailed example from the perspective of efficient supply of the cooling air to the thighs of the operator on the operator seat 18 and therearound, and to the inner surfaces of the control boxes 20A, 20B and therearound. However, the vertical level and the lateral position of each of the left blowing port 41 and the right blowing port 42 should not be limited to the detailed example to be described below.

Figure 10:
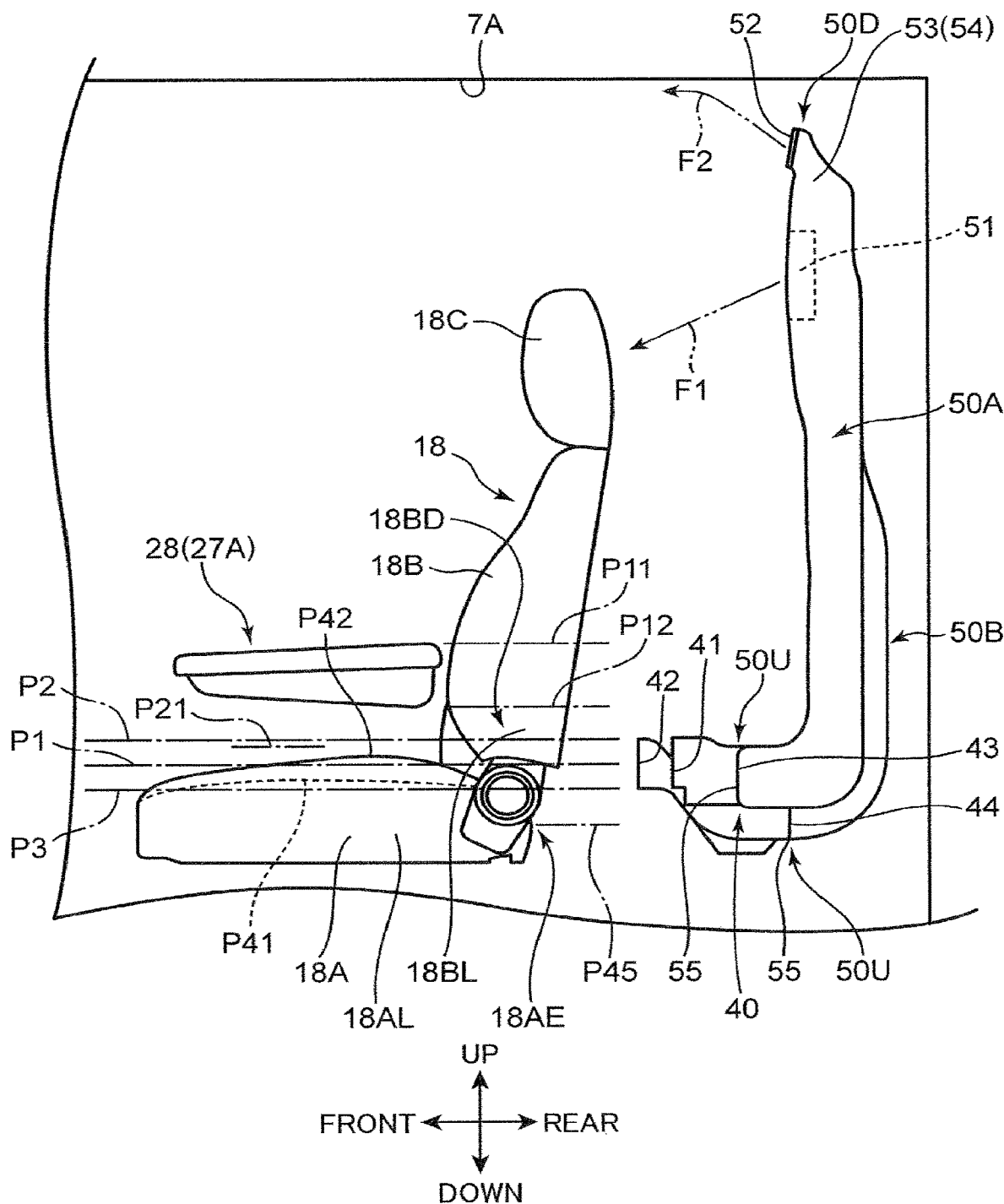
FIG. 10 is a schematic left side view explaining a positional relation among the operator seat, a rear-left duct, and a rear-right duct in the cab according to the embodiment.
Figure 11:
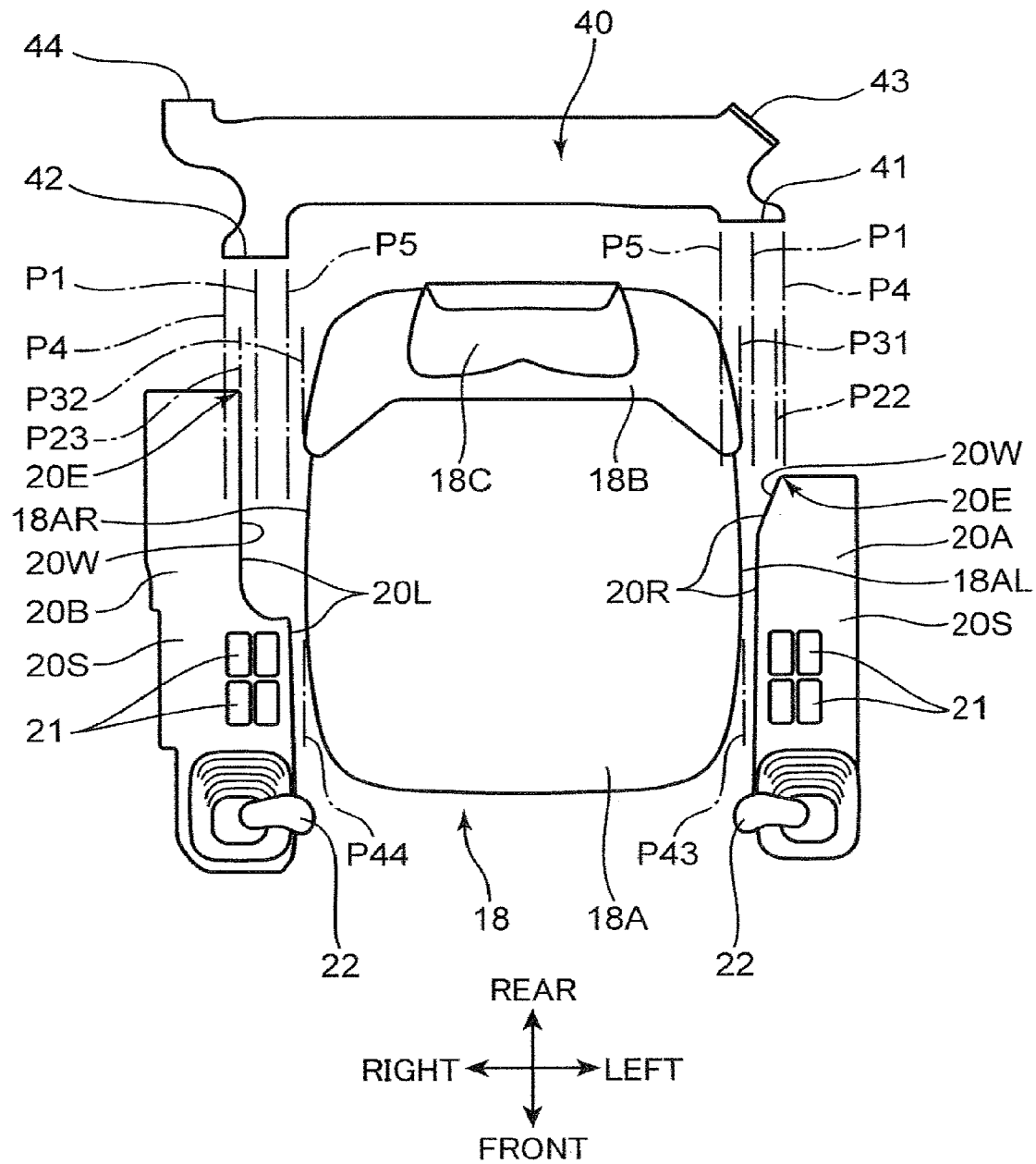
FIG. 11 is a schematic plan view explaining a positional relation among the operator seat, the left and right control boxes, and to-thigh left and right blowing ports of the air conditioner in the cab according to the embodiment.
Figure 12:
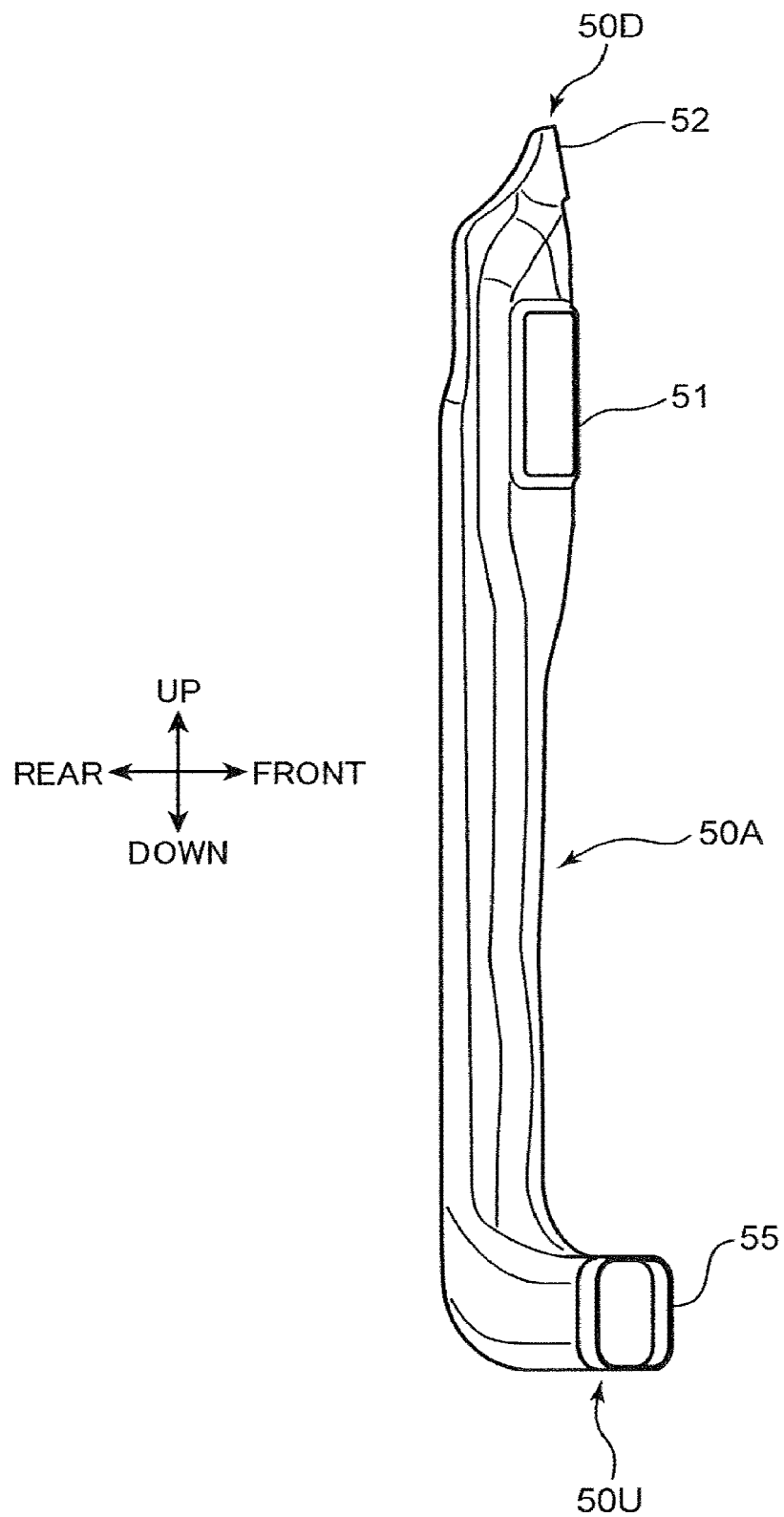
FIG. 12 is a right side view of the rear-left duct of the air conditioner in the cab according to the embodiment.
Figure 13:
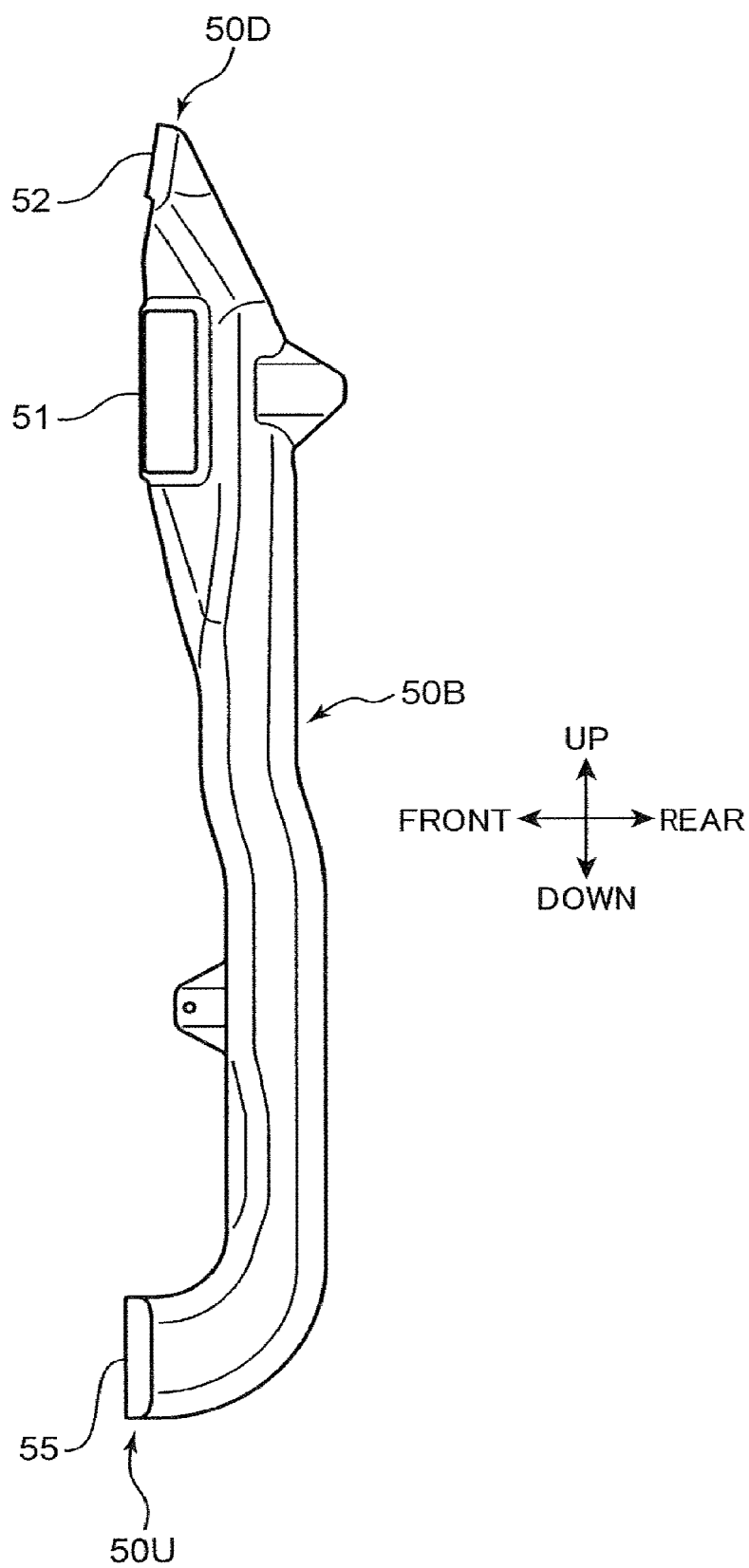
FIG. 13 is a left side view of the rear-right duct of the air conditioner in the cab according to the embodiment.

In FIGS. 3, 10, and 11, a position P1 corresponds to a central position in an up-down direction and that in the left-right direction of each of the left blowing port 41 and the right blowing port 42 of the center duct 40. Specifically, the position P1 represents a vertical level and denotes a lateral position of the center of each of the left blowing port 41 and the right blowing port 42. A position P2 represents a vertical level of an upper end of each of the left blowing port 41 and the right blowing port 42, and a position P3 represents a vertical level of a lower end of each of the left blowing port 41 and the right blowing port 42. A position P4 denotes a lateral position of an outer end of each of left blowing port 41 and the right blowing port 42, i.e., a lateral position of a left end of the left blowing port 41 and a lateral position of a right end of the right blowing port 42. A position P5 denotes a lateral position of the inner end of each of the left blowing port 41 and the right blowing port 42, i.e., a lateral position of the right end of the left blowing port 41 and a lateral position of the left end of the right blowing port 42.

A position P11 represents a vertical level of a top surface of the armrest main body 28. Specifically, the position P11 represents a vertical level of a rear end of the top surface of the armrest main body 28. A position P12 represents a vertical level of a bottom surface of the armrest main body 28. Specifically, the position P12 represents a vertical level of a rear end of the bottom surface of the armrest main body 28.

A position P21 represents a vertical level of the top surface 20S of each of the control boxes 20A, 20B. A position P22 denotes a lateral position of a rear end 20E (see FIG. 11) of the inner surface of the control box 20A, the rear end 20E facing the seat base 18A in the left-right direction. A position P23 denotes a lateral position of a rear end 20E (see FIG. 11) of the inner surface of the control box 20B, the rear end E facing the seat base 18A in the left-right direction.

A position P31 denotes a lateral position of a left end of the backrest 18B of the operator seat 18. A position P32 denotes a lateral position of a right end of the backrest 18B of the operator seat 18.

A position P41 represents a vertical level of the center of the top surface of the seat base 18A of the operator seat 18. A position P42 represents a vertical level of an upper end of the seat base 18A (e.g., a side end of the top surface of the seat base 18A). The center of the top surface of the seat base 18A corresponds to the central position in the front-rear direction of the seat base 18A and the central position in the left-right direction of the seat base 18A on the top surface. Positions P43 and P44 denote lateral positions of opposite outer ends of the seat base 18A. Specifically, the position P43 denotes a lateral position of a left end of the seat base 18A, and the position P44 denotes a lateral position of a right end of the seat base 18A. A position P45 represents a vertical level of a rear end 18AE of the seat base 18A (see FIG. 10). The rear end 18AE is located at the rearmost position of the seat base 18A in a plan view.

First, a preferable vertical level of each of the left blowing port 41 and the right blowing port 42 will be described.

In a side view shown in FIG. 10, the upper end of each of the left blowing port 41 and the right blowing port 42 preferably is located above the rear end 18AE of the seat base 18A. Specifically, in the side view shown in FIG. 10, the vertical level P2 of the upper end of each of the left blowing port 41 and the right blowing port 42 is preferably higher than the vertical level P45 of the rear end 18AE of the seat base 18A, more preferably higher than the vertical level P41 of the center of the top surface of the seat base 18A, and even more preferably higher than the vertical level P42 of the upper end of the top surface of the seat base 18A. Furthermore, in the side view shown in FIG. 10, the vertical level P2 of the upper end of each of the left blowing port 41 and the right blowing port 42 is higher than the vertical level P21 of the top surface 20S of each of the control boxes 20A, 20B.

In the side view shown in FIG. 10, the lower end of each of the left blowing port 41 and the right blowing port 42 preferably is located blow the top surface of the armrest main body 28. Specifically, in the side view shown in FIG. 10, the vertical level P3 of the lower end of each of the left blowing port 41 and the right blowing port 42 is preferably lower than the vertical level P11 of the top surface of the armrest main body 28, and more preferably lower than the vertical level P12 of the bottom surface of the armrest main body 28.

In the side view shown in FIG. 10, the vertical level P1 of the center of each of the left blowing port 41 and the right blowing port 42 is preferably between the vertical level P45 of the rear end 18AE of the seat base 18A and the vertical level P11 of the top surface of the armrest main body 28, more preferably between the vertical level P45 of the rear end 18AE of the seat base 18A and the vertical level P12 of the bottom surface of the armrest main body 28, even more preferably between the vertical level P41 of the center of the top surface of the seat base 18A and the vertical level P12 of the bottom surface of the armrest main body 28, and still more preferably between the vertical level P42 of the upper end of the seat base 18A and the vertical level P12 of the bottom surface of the armrest main body 28.

Next, a preferable lateral position of each of the left blowing port 41 and the right blowing port 42 will be described.

In a front view shown in FIG. 3, the left end of the left blowing port 41 preferably is located to the left of at least one of the left side surface 18AL of the seat base 18A and the left side surface 18BL of the lower portion 18BD of the backrest 18B. Similarly, the right end of the right blowing port 42 preferably is located to the right of at least one of the right side surface AR of the seat base 18A and the right side surface 18BR of the lower portion 18BD of the backrest 18B. Specifically, in the front view shown in FIG. 3, the position P4 of the left end of the left blowing port 41 is preferably to the left of the lateral position P43 of the left end of the left side surface 18AL of the seat base 18A and to the left of the lateral position P31 of the left end of the left side surface 18BL of the lower portion 18BD of the backrest 18B. The position P4 of the right end of the right blowing port 42 is preferably to the right of the lateral position P44 of the right end of the right side surface 18AR of the seat base 18A and to the right of the lateral position P32 of the right end of the right side surface 18BR of the lower portion 18BD of the backrest 1811.

In the front view shown in FIG. 3, the right end of the left blowing port 41 preferably is located to the right of the rear end 20E (see FIG. 10) of the inner surface 20R (the right surface 20R) of the left control box 20A. Besides, in the front view shown in FIG. 3, the left end of the right blowing port 42 preferably is located to the left of the rear end 20E (see FIG. 10) of the inner surface 20L (the left surface 20L) of the right control box 20B. Specifically, in the front view shown in FIG. 3, the lateral position P5 of the right end of the left blowing port 41 is preferably to the right of the lateral position P22 of the rear end 20E of the left control box 20A. The lateral position P5 of the left end of the right blowing port 42 is preferably to the left of the lateral position P23 of the rear end 20E of the right control box 20B.

The lateral position P1 of the center of the left blowing port 41 is preferably between the lateral position P22 of the rear end 20E of the left control box 20A and the lateral position P43 of the left end of the seat base 18A, or between the lateral position P22 and the lateral position 31P of the left end of the backrest 18B. Similarly, the lateral position P1 of the center of the right blowing port 42 is preferably between the lateral position P23 of the rear end 20E of the right control box 20B and the lateral position P44 of the right end of the seat base 18A, or between the lateral position P23 and the lateral position P32 of the right end of the backrest 18B.

As shown in FIG. 11, in the embodiment, each of the left and right control boxes 20A, 20B has a spacing surface 20W for expanding a space between the inner surface of each of the left and right control boxes 20A, 20B (the inner surface of the cover 26) and the seat base 18A so that the cooling air blown out from the left blowing port 41 and the right blowing port 42 of the center duct 40 is efficiently supplied between the corresponding inner surface and each of the thighs of the operator on the operator seat 18. The spacing surface 20W makes the rear end 20E of each of the control boxes 20A, 20B spaced outward from the seat base 18A in the left-right direction. Accordingly, the cooling air can be efficiently supplied between each of the thighs of the operator on the operator seat 18 and the inner surface of each of the control boxes 20A, 20B.

The spacing surface 20W constitutes a part of the inner surface of each of the control boxes 20A, 20B. The spacing surface 20W included in the inner surface of each of the control boxes 20A, 20B is at the same vertical level as at least the seat base 18A. The spacing surface 20W is at the rear part of the inner surface of each of the control boxes 20A, 20B. Further, the spacing surface 20W is located at an outer position in the left-right direction than a front part of the inner surface of each of the control boxes 20A, 20B.

[Rear-Left Duct and Rear-Right Duct]

As shown in FIG. 5, the rear-left duct 50A and the rear-right duct 50B guide the cooling air generated in the air conditioner main body 31 upward. The rear-left duct 50A and the rear-right duct 50B basically have a common structure in the features of the embodiment to be described below except a slight difference seen in their shapes with protrusions, recesses, and curves provided for avoiding interference with other components.

Each of the rear-left duct 50A and the rear-right duct 50B has a vertically extending shape (a long and slender shape in the up-down direction). Each of the rear-left duct 50A and the rear-right duct 50B has a to-head blowing port 51, and a to-ceiling blowing port 52. As shown in FIGS. 3 and 10, the to-head blowing port 51 is provided for blowing out a cooling air F1 toward a vertical level corresponding to that of the headrest 18C. The to-ceiling blowing port 52 is provided for blowing out a cooling air F2 toward a ceiling 7A of the cab 7.

In each of the rear-left duct 50A and the rear-right duct 50B in the embodiment, a central position in the up-down direction of the to-head blowing port 51 is above a central position in the up-down direction of the headrest 18C. As shown in FIGS. 3 and 10, the cooling air F1 blows out from the to-head blowing port 51 diagonally downward and inward in the left-right direction. For instance, the blowing direction of the cooling air F1 is changeable by a well-known blowing-direction adjuster (not shown) provided at a to-head opening 81 of each of the duct covers 80A, 80B to be described later.

The to-ceiling blowing port 52 is located downstream of the to-head blowing port 51 in a flow path of the cooling air in the duct. The to-ceiling blowing port 52 is provided at a downstream end 50D of the duct. The to-ceiling blowing port 52 is spaced upward from the to-head blowing port 51.

[Front Duct]

As shown in FIG. 5, the front duct 60 extends in the front-rear direction, and guides the cooling air (or a warming air) generated in the air conditioner main body 31 frontward. The front duct 60 has a front end formed with a to-defroster blowing port 61, a to-foot blowing port 62 for blowing out the cooling air or warming air toward the feet of the operator, and a to-front body part blowing port 63 for blowing out the cooling air or warming air rearward to the upper body part of the operator. In use of a defroster, the warming air is blown out from the to-defroster blowing port 61.

[Covers]

As shown in FIG. 4, the plurality of covers includes a center duct cover 70, a rear-left duct cover 80A, a rear-right duct cover 80B, and a front duct cover 90.

The center duct cover 70 has such a shape as to cover a part of or all the center duct 40 and the air conditioner main body 31 shown in FIG. 5. The center duct cover 70 has a left opening 71 (a to-thigh left opening) and a right opening 72 (a to-thigh right opening). The left opening 71 is provided to face the left blowing port 41 of the center duct 40 and connected with the left blowing port 41. The right opening 72 is provided to face the right blowing port 42 of the center duct 40 and connected with the right blowing port 42.

The rear-left duct cover 80A has such a shape as to cover a part of or all the rear-left duct 50A shown in FIG. 5. The rear-right duct cover 80B has such a shape as to cover a part of or all the rear-right duct 50B. As shown in FIG. 4, each of the rear-left duct cover 80A and the rear-right duct cover 80B has the to-head opening 81, a to-ceiling opening 82, and the opening and closing member 83. The to-head opening 81 of each of the rear-left duct cover 80A and the rear-right duct cover 80B is provided to face the to-head blowing port 51 of each of the rear-left duct 50A and the rear-right duct 50B, and connected with the to-head blowing port 51. The to-ceiling opening 82 of each of the rear-left duct cover 80A and the rear-right duct cover 80B is provided to face the to-ceiling blowing port 52 of each of the rear-left duct 50A and the rear-right duct 50B, and connected with the to-ceiling blowing port 52.

The front duct cover 90 has such a shape as to cover a part of or all the front duct 60 shown in FIG. 5. The front duct cover 90 has a to-defroster opening 91, a to-foot opening 92, and a to-front body part opening 93. The to-defroster opening 91 is provided to face the to-defroster blowing port 61 of the front duct 60 and connected with the to-defroster blowing port 61. The to-foot opening 92 is provided to face the to-foot blowing port 62 of the front duct 60 and connected with the to-foot blowing port 62. The to-front body part opening 93 is provided to face the to-front body part blowing port 63 and connected with the to-front body part blowing port 63.

Summary of Embodiment

In the above-described cab 7, the cooling air having been cooled in the air conditioner main body 31 and blown out from the left blowing port 41 and the right blowing port 42 of the center duct 40 flows frontward along at least one of a lateral side of the seat base 18A on which the operator is sitting and a lateral side of the lower portion 18BD of the backrest 18B to reach the operator's thighs and therearound. The control boxes 20A, 20B are disposed respectively along the lateral sides of the operator seat 18. Therefore, the inner surface of each of the control boxes 20A, 20B serves as a guide surface which keeps the cooling air flowing frontward along the side of the seat base 18A and/or the side of the lower portion 18BD of the backrest 18B from dispersing outward in the left-right direction. This results in efficient supply of the cooling air flowing frontward along the side of the seat base 18A and/or the side of the lower portion 18BD of the backrest 18B to the operator's thighs and therearound.

Each of the control boxes 20A, 20B includes the manipulation lever 22, and the unillustrated valve such as a pilot valve openable and closable in response to a manipulation to the manipulation lever 22. The valve is a member having a temperature which is likely to rise during an operation of the construction machine, and thus each of the control boxes 20A, 20B including the valve also has a temperature which is likely to rise. The operator on the seat base 18A of the operator seat 18 located on the corresponding side of each of the control boxes 20A, 20B may feel uncomfortable when receiving an influence of heat from the control boxes 20A, 20B particularly onto the operator's thighs and therearound. Even in this case, the cooling air having been cooled in the air conditioner main body 31 and blown out from the left blowing port 41 and the right blowing port 42 flows frontward along the inner surfaces 20R, 20L of the control boxes 20A, 20B in the cab 7 according to the embodiment. As a result, it is possible to reduce the influence of heat from the control boxes 20A, 20B onto the operator's thighs and therearound.

In the cab 7 according to the embodiment, the cooling air having been cooled in the air conditioner main body 31 and blown out from the left blowing port 41 and the right blowing port 42 flows frontward along the inner surfaces of the control boxes 20A, 20B. This contributes to the reduction in the influence of the heat from the control boxes 20A, 20B onto the operator's thighs and therearound.

In the cab 7 according to the embodiment 7, the air conditioner main body 31 includes the casing 36. The casing 36 has the air inlet 32, and the air outlet 34 for blowing out the cooling air. The center duct 40 has the connection port 45 connected with the air outlet 34 for receiving the cooling air blowing out from the air outlet 34. The central position C1 between the left end 45A and the right end 45B of the connection port 45 in the left-right direction deviates from the central position C2 between the center of the left blowing port 41 and the center of the right blowing port 42 in the left-right direction to one side in the left-right direction. The center duct 40 has the minimal flow passage portion 46 between the central position C1 of the connection port 45 and the inner end (the left end 42E) of the right blowing port 42. The minimal flow passage portion 46 has the smallest flow passage cross-sectional area between the inner end 41E of the left blowing port 41 and the inner end 42E of the right blowing port 42 of the center duct 40. In this configuration, the minimal flow passage portion 46 provides a resistance against the flow of the cooling air, thereby preventing the cooling air from increasingly flowing to the right blowing port 42. This consequently achieves decreased variations in flow rate of the air blown out from the left and right blowing ports 41, 42.

The cab 7 according to the embodiment further includes armrests 27A, 28B each including the armrest main body 28 extending in the front-rear direction, and the support member 29 for supporting the armrest main body 28. The lower portion 18BD of the backrest 18B is located below the top surface of the armrest main body 28. Generally, the operator on the seat base 18A of the operator seat 18 manipulates the manipulation lever 22 provided on each of the control boxes 20A. 20B while putting the operator's forearm on the armrest main body 28. In this manipulating posture, normally, the vertical level of each of the operator's thighs is slightly lower than the position of the forearm, i.e., is located slightly below the top surface of the armrest main body 28. Hence, the cooling air having been blown out from the left blowing port 41 and the right blowing port 42 frontward flows further frontward along an outer side part of the lower portion 18BD of the backrest 18B, i.e., along an outer side part of the lower portion of the backrest 18B that is a portion located below the top surface of the armrest main body 28. In this way, the cooling air is efficiently supplied to the thighs of the operator on the seat base 18A. Consequently, the occurrence of sweating and dumping on the thighs can be reliably suppressed.

In the cab 7 according to the embodiment, each of the left blowing port 41 and the right blowing port 42 can be located, for example, in the following manner. Specifically, in the side view, the lower end of the blowing port is located below the top surface of the armrest main body 28. In the side view, the upper end of the blowing port is located above the rear end of the seat base 18A. In the front view, the outer end of the blowing port is located at an outer position in the left-right direction than at least one of the outer side surface of the seat base 18A and the outer side surface of the lower portion 18BD of the backrest 18B. In the front view, the inner end of the blowing port is located at an inner position in the left-right direction than the rear end of the inner surface of the corresponding control box. Each of the left blowing port 41 and the right blowing port 42 in the location permits the cooling air blown out therefrom to easily flow frontward along at least one of the side of the outer side surface of the seat base 18A and the side of the outer side surface of the lower portion 18BD of the backrest 18B and along the inner surface of the corresponding control box.

[Modifications]

The present invention should not be limited to the embodiment described above. The present invention may include, for example, the following aspects.

(A) Although the center duct 40 in the embodiment has the left blowing port 41 and the right blowing port 42, the center duct 40 in the cab 7 according to the present invention may include at least one of the left blowing port 41 and the right blowing port 42.

(B) Although the center duct 40 in the embodiment has the minimal flow passage portion 46, the minimal flow passage portion 46 may be excluded.

As described above, provided is a cab for a construction machine, the cab being capable of suppressing an occurrence of sweating and damping on operator's thighs being in contact with a top surface of a seat base of an operator seat.

Provided is a cab for a construction machine, including: an operator seat including a seat base and a backrest extending upward from the seat base; a control box disposed along a lateral side of the operator seat; an air conditioner main body for cooling an air; and a duct disposed behind the operator seat for guiding a cooling air generated in the air conditioner main body. The control box has an inner surface extending in a front-rear direction along the seat base. The duct has a blowing port for blowing out the cooling air. The blowing port is at such a position as to allow the cooling air blown out from the blowing port to flow frontward along at least one of a lateral side of the seat base and a lateral side of a lower portion of the backrest and along the inner surface of the control box.

In this cab, the cooling air having been cooled in the air conditioner main body and blown out from the blowing port flows frontward along at least one of a lateral side of the seat base on which the operator is sitting and a lateral side of the lower portion of the backrest. An outer side part of the seat base is located approximately just next to an outer side part of the thigh of the operator, and an outer side part of the lower portion of the backrest is located approximately just behind the outer side part of the thigh of the operator on the seat base. In this configuration, the cooling air flowing frontward along the lateral side of the seat base and/or the lateral side of the lower portion of the backrest reaches the operator's thigh and therearound. Furthermore, the control box is disposed along a lateral side of the operator seat.

Therefore, the inner surface of the control box serves as a guide surface which keeps the cooling air flowing frontward along the lateral side of the seat base and/or the lateral side of the lower portion of the backrest from dispersing outward in the left-right direction. This results in efficient supply of the cooling air flowing frontward along the lateral side of the seat base and/or the lateral side of the lower portion of the backrest to the operator's thigh and therearound. Accordingly, the occurrence of sweating and damping on the operator's thigh being in contact with the top surface of the seat base of the operator seat can be suppressed in the cab.

In many cases, the control box generally includes a member having a temperature which is likely to rise during an operation of a construction machine, and thus the control box including this member also has a temperature which is likely to rise. The operator on the seat base of the operator seat located along the side of the control box may feel uncomfortable when receiving an influence of heat from the control box particularly onto the operator's thigh and therearound. Even in such cases, the cooling air having been cooled in the air conditioner main body and blown out from the blowing port flows frontward along the inner surface of the control box in the cab. As a result, it is possible to reduce the influence of heat from the control box onto the operator's thigh and therearound. This further leads to suppression of the occurrence of sweating and damping on the operator's thigh being in contact with the top surface of the seat base of the operator seat even in the cab including the member having the temperature which is likely to rise.

In the cab for a construction machine, it is preferable that the control box is a left control box disposed along a left side of the operator seat, and that the blowing port is a left blowing port provided at such a position as to allow the cooling air blown out from the left blowing port to flow frontward along at least one of a left side of the seat base and a left side of the lower portion of the backrest and along a right surface of the left control box. The cab preferably further includes a right control box disposed along a right side of the operator seat. It is preferable that the right control box has an inner surface extending in the front-rear direction along the seat base, the duct further has a right blowing port for blowing out the cooling air, and that the right blowing port is at such a position as to allow the cooling air blown out from the right blowing port to flow frontward along at least one of a right side of the seat base and a right side of the lower portion of the backrest and along a left surface of the right control box. In this aspect, the occurrence of sweating and damping on both the operator's left and right thighs being in contact with the top surface of the seat base of the operator seat can be suppressed.

In the cab for a construction machine, the air conditioner main body may include a casing, the casing may have an air inlet, and an air outlet for blowing out the cooling air, the duct may have a connection port connected with the air outlet for receiving the cooling air blown out from the air outlet, a central position between a left end and a right end of the connection port in a left-right direction may deviate from a central position between the center of the left blowing port and the center of the right blowing port in the left-right direction to one side in the left-right direction, the duct may have a minimal flow passage portion between the central position of the connection port and an inner end of one of the left and right blowing ports that is located on the one side in the left-right direction, and the minimal flow passage portion may have a smallest flow passage cross-sectional area between the inner end of the left blowing port and the inner end of the right blowing port of the duct. In this aspect, even in the case where the central position of the connection port of the duct deviates from the central position between the center of the left blowing port and the center of the right blowing port to the one side in the left-right direction, the minimal flow passage portion provides a resistance against the flow of the cooling air, thereby preventing the cooling air from increasingly flowing to the blowing port located on the one side. This consequently achieves decreased variations in flow rate of the air blown out from the left and right blowing ports.

The cab for a construction machine preferably further includes an armrest including an armrest main body extending in the front-rear direction and a support member for supporting the armrest main body, and it is preferable that the lower portion of the backrest is located below a top surface of the armrest main body. Generally, the operator on the seat base of the operator seat manipulates the manipulation lever provided on the control box while putting the operator's forearm on the armrest main body. In this manipulating posture, normally, the vertical level of each of the operator's thighs is slightly lower than the position of the forearm, i.e., is located slightly below the top surface of the armrest main body. Hence, the cooling air having been blown out from the blowing port frontward flows further frontward along the outer side part of the lower portion of the backrest, i.e., along the outer side part of the lower portion of the backrest that is a portion located below the top surface of the armrest main body. In this way, the cooling air is efficiently supplied to the thigh of the operator on the seat base. Consequently, the occurrence of sweating and dumping on the thigh can be reliably suppressed.

In the cab for a construction machine, the blowing port can be located, for example, in the following manner. Specifically, in a side view, a lower end of the blowing port may be located below the top surface of the armrest main body. In the side view, an upper end of the blowing port may be located above a rear end of the seat base. In a front view, an outer end of the blowing port may be located at an outer position in the left-right direction than at least one of an outer side surface of the seat base and an outer side surface of the lower portion of the backrest. In the front view, the inner end of the blowing port may be located at an inner position in the left-right direction than a rear end of the inner surface of the control box. The blowing port in the location permits the cooling air blown out from the blowing port to easily flow frontward along at least one of the side of the outer side surface of the seat base and the side of the outer side surface of the lower portion of the backrest and along the inner surface of the control box.

The invention claimed is:

1. A cab for a construction machine, comprising:
an operator seat including a seat base and a backrest extending upward from the seat base;
a control box including a box main body and a manipulation lever, the box main body being disposed along a lateral side of the operator seat, the manipulation lever protruding upward from a top surface of the box main body;
an air conditioner main body for cooling an air; and
a duct disposed behind the operator seat for guiding a cooling air generated in the air conditioner main body, wherein
the box main body of the control box has an inner surface extending in a front-rear direction along the seat base,
the duct has a blowing port for blowing out the cooling air,
the blowing port is at such a position as to allow the cooling air blown out from the blowing port to flow frontward along at least one of a lateral side of the seat base and a lateral side of a lower portion of the backrest and along the inner surface of the box main body of the control box, and
a lower end of the blowing port is located below an upper end of the seat base.

2. The cab for a construction machine according to claim 1, wherein
the control box is a left control box disposed along a left side of the operator seat, and
the blowing port is a left blowing port provided at such a position as to allow the cooling air blown out from the left blowing port to flow frontward along at least one of a left side of the seat base and a left side of the lower portion of the backrest and along a right surface of the box main body of the left control box,
the cab further comprising a right control box including a box main body and a manipulation lever, the box main body of the right control box being disposed along a right side of the operator seat, the manipulation lever of the right control box protruding upward from a top surface of the box main body of the right control box, wherein
the box main body of the right control box has an inner surface extending in the front-rear direction along the seat base,
the duct further has a right blowing port for blowing out the cooling air,
the right blowing port is at such a position as to allow the cooling air blown out from the right blowing port to flow frontward along at least one of a right side of the seat base and a right side of the lower portion of the backrest and along a left surface of the box main body of the right control box, and
a lower end of the right blowing port is located below the upper end of the seat base.

3. The cab for a construction machine according to claim 2, wherein
the air conditioner main body includes a casing,
the casing has an air inlet, and an air outlet for blowing out the cooling air,
the duct has a connection port connected with the air outlet for receiving the cooling air blown out from the air outlet,
a central position between a left end and a right end of the connection port in a left-right direction deviates from a central position between the center of the left blowing port and the center of the right blowing port in the left-right direction to one side in the left-right direction,
the duct has a minimal flow passage portion of a flow passage between the central position of the connection port and an inner end of one of the left and right blowing ports that is located on the one side in the left-right direction, and
the minimal flow passage portion has a smallest flow passage cross-sectional area between the inner end of the left blowing port and the inner end of the right blowing port of the duct compared to other portions of the flow passage.

4. The cab for a construction machine according to claim 1, further comprising an armrest including an armrest main body extending in the front-rear direction and a support member for supporting the armrest main body, wherein
the lower portion of the backrest is located below a top surface of the armrest main body.

5. The cab for a construction machine according to claim 4, wherein
   in a side view, a lower end of the blowing port is located below the top surface of the armrest main body,
   in the side view, an upper end of the blowing port is located above a rear end of the seat base,
   in a front view, an outer end of the blowing port is located at a further outer position in the left-right direction than at least one of an outer side surface of the seat base and an outer side surface of the lower portion of the backrest, and
   in the front view, the inner end of the blowing port is located at a further inner position in the left-right direction than a rear end of the inner surface of the control box.

6. The cab for a construction machine according to claim 1, wherein a lateral position of a center of the blowing port is between a lateral position of a rear end of an inner surface of the box main body of the control box and the seat base, or between the lateral position of the rear end and the backrest.

7. The cab for a construction machine according to claim 1, wherein the blowing port is disposed behind a space between the inner surface of the box main body and the seat base.

\* \* \* \* \*